United States Patent [19]

Ito et al.

[11] Patent Number: 4,941,541
[45] Date of Patent: Jul. 17, 1990

[54] DEVICE FOR DISTRIBUTING DRIVE POWER IN THE DRIVE TRAIN OF A FOUR WHEEL DRIVE VEHICLE

[75] Inventors: Hideo Ito, Zushi; Masatsugu Yokote, Yokohama, both of Japan

[73] Assignee: Nissan Motor Co., Ltd., Yokohama, Japan

[21] Appl. No.: 254,875

[22] Filed: Oct. 7, 1988

[30] Foreign Application Priority Data

Oct. 8, 1987 [JP] Japan .................................. 62-254218
Oct. 8, 1987 [JP] Japan .................................. 62-254219

[51] Int. Cl.$^5$ ............................................. B60K 17/34
[52] U.S. Cl. ..................................... 180/140; 180/234
[58] Field of Search ................ 180/140, 142, 234, 233, 180/248; 280/91; 364/424, 424.05

[56] References Cited

U.S. PATENT DOCUMENTS

| | | | |
|---|---|---|---|
| 4,412,594 | 11/1983 | Furukawa et al. | 180/140 |
| 4,466,502 | 8/1984 | Sakai | 180/247 |
| 4,484,654 | 11/1984 | Hayakawa | 180/247 |
| 4,511,014 | 4/1985 | Makita | 180/233 |
| 4,558,414 | 12/1985 | Sakakiyama | 180/233 |
| 4,562,541 | 12/1985 | Sakakiyama | 180/197 |
| 4,566,554 | 1/1986 | Suzuki | 180/249 |
| 4,586,583 | 5/1986 | Yamakawa et al. | 180/247 |
| 4,609,064 | 9/1986 | Suzuki et al. | 180/233 |
| 4,613,008 | 9/1986 | Hiraiwa et al. | 180/247 |
| 4,651,847 | 3/1987 | Hermanns | 180/245 |
| 4,664,216 | 5/1987 | Kodama et al. | 180/233 |
| 4,678,056 | 7/1987 | Kobari et al. | 180/247 |
| 4,715,466 | 12/1987 | Ishii et al. | 180/140 |
| 4,754,834 | 7/1988 | Ozaki et al. | 180/233 |
| 4,768,602 | 9/1988 | Inoue et al. | 180/233 |

FOREIGN PATENT DOCUMENTS

| | | |
|---|---|---|
| 0189176 | 7/1986 | European Pat. Off. . |
| 2022469 | 5/1970 | Fed. Rep. of Germany . |
| 2026216 | 12/1970 | Fed. Rep. of Germany . |
| 2245701 | 3/1973 | Fed. Rep. of Germany . |
| 3145279 | 5/1983 | Fed. Rep. of Germany . |
| 3345470 | 7/1984 | Fed. Rep. of Germany . |
| 3434395 | 5/1985 | Fed. Rep. of Germany . |
| 3427725 | 8/1985 | Fed. Rep. of Germany . |
| 3437435 | 8/1986 | Fed. Rep. of Germany . |
| 55-152623 | 11/1980 | Japan . |
| 61-157437 | 7/1986 | Japan . |
| 61-157438 | 7/1986 | Japan . |
| 61-193931 | 8/1986 | Japan . |
| 61-244627 | 10/1986 | Japan . |
| 61-244628 | 10/1986 | Japan . |
| 62-8869 | 1/1987 | Japan . |
| 62-99213 | 5/1987 | Japan .................................. 180/248 |
| 62-241732 | 10/1987 | Japan . |
| 882787 | 11/1981 | U.S.S.R. . |
| 2102907 | 2/1983 | United Kingdom . |
| 2118666 | 11/1983 | United Kingdom . |
| 2167718 | 6/1986 | United Kingdom . |
| 2167824 | 6/1986 | United Kingdom . |

Primary Examiner—Mitchell J. Hill
Attorney, Agent, or Firm—Foley & Lardner, Schwartz, Jeffrey, Schwaab, Mack, Blumenthal & Evans

[57] ABSTRACT

In order to improve the steering and handling characteristics of a four wheel drive vehicle wherein at least one of the front and rear sets of wheels are provided with an auxiliary steering device, the steering condition of the vehicle is sensed and in the event that the steering is such that yaw can be easily induced the amount of power which is distributed to the front wheels is decreased relative to the amount prior the instant steering condition being established and vice versa.

6 Claims, 7 Drawing Sheets

DEVICE FOR DISTRIBUTING DRIVE POWER IN THE DRIVE TRAIN OF A FOUR WHEEL DRIVE VEHICLE

BACKGROUND OF THE INVENTION

1. Field of the Invention

The present invention relates generally to four wheel drive vehicles and more specifically to a four wheel drive vehicle wherein at least one of the front and rear wheels are provided with an auxiliary steering arrangement and wherein the distribution of torque between the front and rear wheels is selectively controllable.

2. Description of the Prior Art

JP-A-62-8869 discloses a previously proposed 4 wheel drive arrangement wherein the forward wheels of the vehicle are variably supplied with driving torque and wherein the rear wheels are provided with an auxiliary steering system.

The auxiliary steering system is arranged so that, depending on the front wheel steering angle, the steering of the rear wheels is varied with respect to a predetermined steering characteristic.

This arrangement further includes correction means which varies or modifies the steering ratio characteristics. This correction means is responsive to the change in torque distribution and is arranged so that irrespective of the changes in torque distribution, changes in the steering characteristics are prevented by correcting the auxiliary steering angle in a manner wherein the vehicle slip angle is always held essentially at zero.

However, because the rear wheel steering angle is corrected simply on the basis of the torque distribution, it occurs that, in the event of sudden steering under the driving conditions wherein the auxiliary steering angle is set in a manner to promote the ease with which yaw can be induced and the torque distribution device is operated to distribute the driving torque in a manner which tends to resist the augmentation or ease with yaw can be induced, the driving torque tends to be excessively distributed to the front wheels with the result that the steering characteristics undergo an undesirable change.

On the other hand, in the event that driving conditions are such that the auxiliary steering angle becomes set in a manner to inhibit the ease with which yaw can be induced and the torque distribution device is operated to distribute the driving torque in a manner to augment or promote the ease with which yaw is induced, it occurs that the driving torque is largely distributed to the rear wheels with the result that the steering characteristics again undergo an undesirable change.

SUMMARY OF THE INVENTION

It is an object of the present invention to providing a system which changes the distribution of the driving torque between the front and rear wheels in a manner which obviates any unexpected change in steering characteristics irrespective of the driving conditions under which sudden change in steering are induced.

In brief, the above object is achieved by an arrangement wherein the steering condition of the vehicle is sensed and in the event that the steering is such that yaw can be easily induced the amount of power which is distributed to the front wheels is decreased relative to the amount prior the instant steering condition being established and vice versa.

More specifically, a first aspect of the present invention is deemed to comprise a four wheel drive train for an automotive vehicle which features: an auxiliary steering device for providing auxiliary steering of at least one of the front and rear wheels, the auxiliary steering device being responsive to a manually induced steering angle of the front wheels in a manner to vary the amount of auxiliary steering produced by the auxiliary steering device; auxiliary steering control means for controlling the auxiliary steering device; sensor means for sensing the steering condition which is induced by the amount the yaw rate is increased by the auxiliary steering device; a device for distributing driving torque from a prime mover between the forward and rear wheels of the vehicle; a device for controlling the torque distribution device; and means for correcting the amount of driving torque which is supplied to the front wheels by the torque distributing device, the correcting means being responsive to the sensor means in a manner wherein when sensor means senses a steering condition wherein the ease with which yaw can be induce changes, the amount by which the driving torque distribution device distributes driving torque between the front and rear wheels is changed relative to the torque distribution before one of the auxiliary steering and the yaw rate varies in a manner to avoid sudden changes in the steering characteristics of the vehicle.

A second aspect of the present invention is deemed to comprise a four wheel drive train for an automotive vehicle which features; an auxiliary steering device for providing auxiliary steering of at least one of the front and rear wheels, the auxiliary steering device being responsive to a manually induced steering angle of the front wheels in a manner to vary the amount of auxiliary steering produced by the auxiliary steering device; auxiliary steering control means for controlling the auxiliary steering device; sensor means for sensing the steering condition which is induced by the amount the yaw rate is increased by the auxiliary steering device; a device for distributing driving torque from a prime mover between the forward and rear wheels of the vehicle; a device for controlling the torque distribution device; and means for correcting the amount of driving torque which is supplied to the front wheels by the torque distributing device, the correcting means being responsive to the sensor means in a manner wherein when sensor means senses a steering condition wherein the ease with which yaw can be induced is increased, the amount by which the driving torque distribution device distributes driving torque to the front wheels is reduced relative to the amount of torque distribution before one of the auxiliary steering and the yaw rate is increased.

A third aspect of the present invention is deemed to comprise a four wheel drive train for an automotive vehicle which features; an auxiliary steering device for providing auxiliary steering of at least one of the front and rear wheels, the auxiliary steering device being responsive to a manually induced steering angle of the front wheels in a manner to vary the amount of auxiliary steering produced by the auxiliary steering device; auxiliary steering control means for controlling the auxiliary steering device; sensor means for sensing the steering condition which is induced by the amount the yaw rate is increased by the auxiliary steering device; a device for distributing driving torque from a prime mover between the forward and rear wheels of the vehicle; a device for controlling the torque distribution device; and means for correcting the amount of driving torque which is supplied to the front wheels by the torque distributing device, the correcting means being responsive to the sensor means in a manner wherein when sensor means senses a steering condition wherein the ease with which yaw can the induced is attenuated, the amount by which the driving torque distribution device distributes driving torque to the front wheels is increased relative to the amount of torque distribution before one of the auxiliary steering and the yaw rate is increased.

DETAILED DESCRIPTION OF THE PREFERRED EMBODIMENTS

Figure 1:
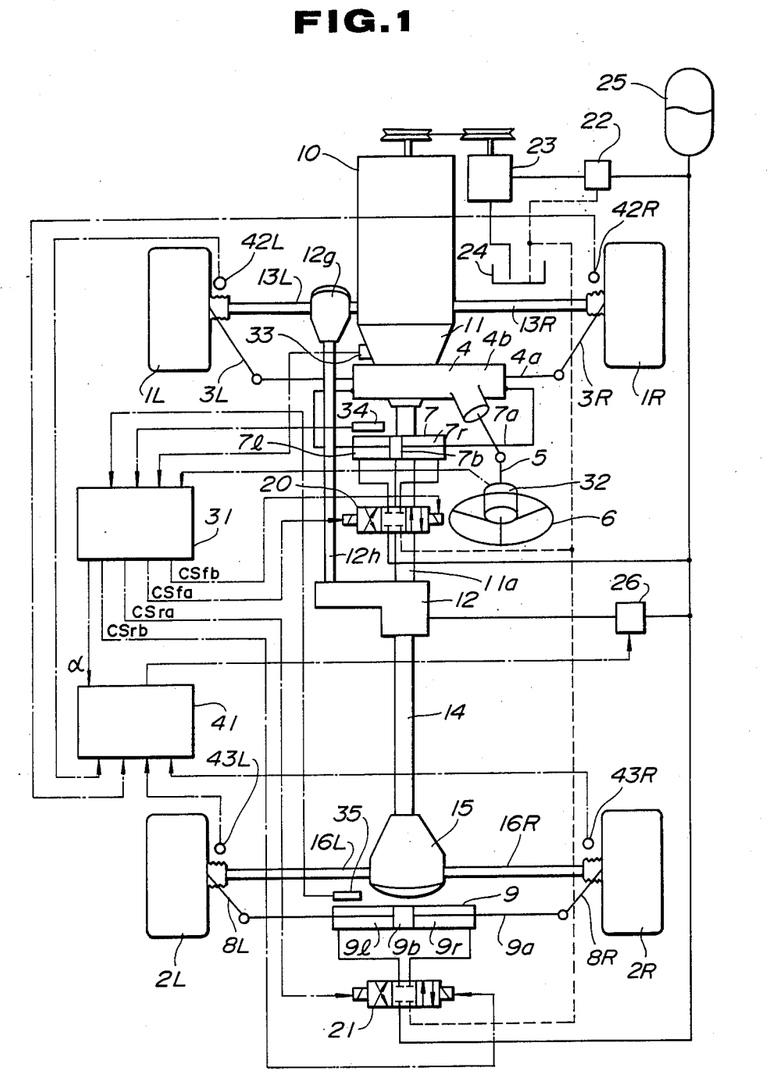
FIG. 1 shows in schematic form a four wheel drive system which is equipped with the present invention.

FIG. 1 shows a four wheel drive arrangement which incorporates a first embodiment of the present invention. In this figure, 1L and 1R denote the front wheels of the vehicle, 2L, 2R denote the rear wheels, 3L, 3R denote tie rods which are operatively connected at therein outboard ends to the front wheels by unillustrated knuckle rods. The inboard ends of the rods are connected to a rack and pinion steering arrangement 4.

A steering shaft 5 interconnects the rack and pinion steering arrangement 4 with a steering wheel 6. A housing 4a in which the rack and pinion mechanism is disposed, is resiliently supported on the vehicle chassis (not shown). A hydraulic cylinder 7 which defines part of a forward wheel auxiliary steering device is resiliently supported on the vehicle chassis by way of elastomeric mounting members or the like (not shown), adjacent the rack and steering housing 4b. This cylinder 7 includes a piston 7b and a piston rod 7a fixedly connected therewith. The piston rods 7a are operatively connected with the housing 4b in a manner which enables the housing 4a to be selectively moved laterally with respect to the chassis against the bias of the elastomeric supports.

On the other hand, the rear wheels 2L and 2R are operatively connected with a rear wheel auxiliary steering wheel control cylinder 9 by way of unillustrated knuckle rods and a tie rods 8L and 8R. The cylinder 9 includes a piston 9b and piston rods 9a. The outboard ends of the piston rods 9a are operatively connected with tie rods 8L, 8R.

The front and rear wheels are operatively connected with engine or prime mover 10 of the vehicle by way of a transmission gear 11 and multi-plate type clutch transfer unit 12. The just mentioned transmission transfer unit 12 is arranged in the manner shown in FIG. 2. However, as will be appreciated from this figure the output shaft 11a of the transmission 11 is connected directly to the rear wheels by way of a propeller shaft 14. On the other hand, the output shaft 11a is connected with the front wheels by way of a multi-plate hydraulic clutch 12a, a gear 12c which is disposed on a clutch hub 12b, an intermediate shaft 12d, and a gear 12e which is carried on the intermediate shaft and which meshes with the gear 12c.

The transfer unit 12 is connected with a forward differential gear unit 12g (shown in FIG. 1) by way of a second propeller shaft 12h. The front wheels are supplied torque by way of forward stub shafts 13L and 13R which operatively interconnect the forward wheels 1L and 1R with the forward differential unit 12g.

The first propeller shaft 14 is connected at the aft end thereof to a rear differential gear unit 15. The rear wheels are operatively connected with the rear differential gear unit 15 by way of stub shafts 16L and 16R.

The forward and rear wheel auxiliary steering cylinders 7, 9 are arranged so that their respective pistons 7b and 9b defined first and second variable volume chambers 7l, 7r and 9l, 9r in each of the cylinders. These chambers are fluidly connected with closed center type servo valves 20 and 21 in the illustrated manner.

The servo valves 20 and 21 are arranged so that their inlet ports (no numerals) are fluidly connected with an engine drive oil pump 23 by way of a relief or unload valve 22, while the drain ports thereof are arranged to communicated with a reserver tank 24 by way of lines shown in broken line. A pressure accumulator 25 is fluidly connected with the pressure supply lines which lead from the source of hydraulic fluid under pressure to the above mentioned inlet ports. The relief valve is arranged to discharge a predetermined pressure or "line" pressure as it will be referred to hereinafter.

Figure 2:
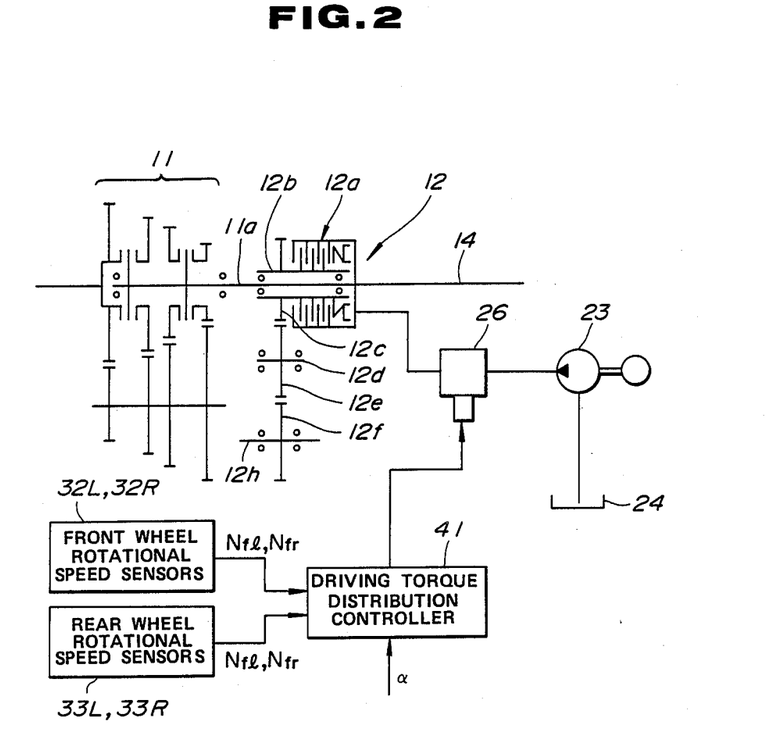
FIG. 2 shows in schematic form a portion of the system shown in FIG. 1.

The multi-plate clutch 21a of the transfer unit 12 is supplied hydraulic pressure via a electromagnetic valve 26. This valve is arranged to control the pressure which is supplied to the clutch engagement chamber in a manner which enables the amount of torque distributed to the forward wheels to be selectively controlled.

The above mentioned servo valves 20 and 21 are operatively connected to an auxiliary steering control unit or controller 31 which in this instance includes a microprocessor. In this embodiment the microprocessor is arranged to output various inputted data and to induce the generation of appropriate control signals which are fed to the solenoids incorporated in the valves.

The auxiliary steering controller 31 is operatively connected with a plurality of sensors. These sensors include a steering angle sensor 32 which is operatively connected with the steering wheel 6 of the vehicle in a manner to sense what shall be referred to as a steering angle; a vehicle speed sensor 33 which is operatively connected with the transmission gear 11; a displacement sensor 34 which senses the amount of displacement produced by the operation of the hydraulic cylinder 7; a second displacement sensor 35 which senses the amount of displacement produced by the hydraulic cylinder 9. The inputs from these sensors are used to control the supply of hydraulic pressure into the chambers of the cylinders 7 and 9.

In connection with the above mentioned control, the vehicle speed valve V is used to derive proportioning constants Kf, Kr and differential constants tau f and tau r as advance factors. These factors are used in combination with the steering angle theta and used in equations (1) and (2) (which are set forth hereinbelow) in a manner to derive the forward and rear steering angles delta f(s) and delta r(s). These angles are in turn used to calculate forward and rear auxiliary steering angle command values delta f and delta r using a Laplace reverse transformation. Following this the amount of change per unit time of the command vaues, viz., DELTA delta f and DELTA delta r, are obtained.

In accordance with these values the ease with which vehicle yaw can be induced, viz., when DELTA delta f<0, DELTA delta r<0, the controller 41 outputs a driving torque or power distribution correction factor alpha which has a value less than one to the torque distribution controller 41. At the same time the above mentioned front and rear wheel auxiliary steering command values delta f and delta r, and the signals produced by the displacement sensors 34 and 35 (viz., delta fd and delta rd) are arranged so that the difference therebetween is brought to zero and appropriate control signals are fed to each of the servo valves 20 and 21.

$$\text{delta } f(s) = (Kf + \text{tau } f\,S)\text{theta}(s) \quad (1)$$

$$\text{delta } r(s) = (Kr - \text{tau } r\,S)\text{theta}(s) \quad (2)$$

given that:

$$Kf = Kr = a\,M\,Cf\,V^2 + b1\,Cf\,Cr/1^2\,Cf\,Cr + (b\,Cr - a\,Cf)M\,V^2$$

$$\text{tau } f = Cr\,I\,V/1^2\,Cf\,Cr + (b\,Cr - a\,Cr)M\,V^2$$

and $$\text{tau } r = Cf\,I\,V/1^2\,Cf\,Cr + (b\,Cr - a\,Cr)M\,V^2$$

wherein:
Cf: denotes the front wheel cornering power;
Cr: denotes the rear wheel cornering power;
1: denotes the wheel base;
a: denotes the distance from the center of gravity of the vehicle to the front wheels;
b: denotes the distance from the center of gravity of the vehicle to the rear wheels;
M: denotes the mass of the vehicle;
I: denotes the yaw moment;
V: denotes vehicle speed;
S: denotes Laplaces operator.

The electromagnetic valve 26 is controlled by a power or torque distribution controller 41 which in this embodiment includes a microprocessor. This controller 41 is supplied with data input from forward and rear wheel speed sensors 42L, 42R, 43L and 43R in the form of signals Nfl, Nfr, Nrl and Nrr. The controller also receives a signal from the auxiliary steering controller 31 indicative of the magnitude of alpha.

Utilizing the above mentioned data the controller 41 derives the difference DELTA N between the rotational speeds of the front and rear wheels using the following equation:

$$\text{DELTA } N = N\,rl + N\,rr/2 - N\,fl + N\,fr/2 \quad (3)$$

Figure 3:
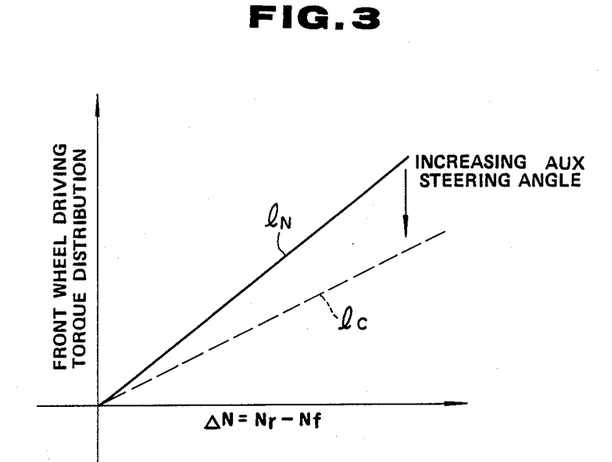
FIGS. 3 and 4 are charts which show the data used during the operation of a first embodiment of the invention under a first set of driving conditions when the auxiliary steering angle is set in a manner to promote the ease with which yaw can be induced and the torque distribution device is operated to distribute the driving torque in a manner which tends to resist the augmentation or ease with yaw can be induced.

This value is used in connection with a table of the nature shown in FIG. 3 which is stored in ROM of the microprocessor included in the controller 41. Using the characteristics indicated by the solid line 1N it is possible to obtain a front wheel drive torque distribution value T and to use this valve in combination with torque distribution correction value alpha to obtain a value T' (T' = T × alpha).

The electromagnetic valve 26 is controlled in accordance with the value of T' and in turn controls the amount of torque which is distributed to the front wheels.

Figure 7:
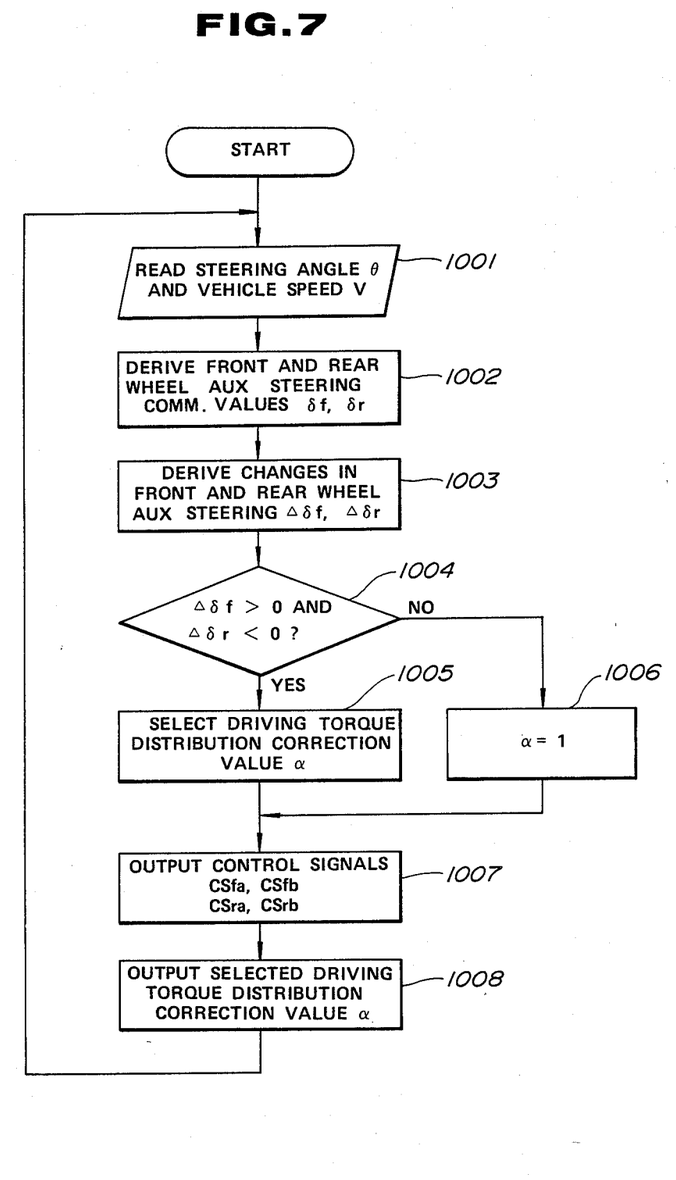
FIG. 7 is a flow chart showing the basic control steps which are executed in accordance with the first embodiment of the instant invention wherein the vehicle is subject to driving under the above mentioned first set of driving conditions.

The operation of this embodiment of the present invention will now be explained with reference to the flow chart which is shown in FIG. 7.

This flow chart depicts a routine which is repeated at a predetermine time interval and wherein the first step (1001) is such as to read the output of the steering angle sensor 32 and vehicle speed sensor and suitably record the instant values of theta and V. Using the data recorded in step 1001, front and rear wheels steering angles delta f (s) and delta r (s) are calculated in step 1002 using equations (1) and (2) set forth hereinbefore, and subsequently corresponding steering command valves delta f and delta r are derived using the aformentioned Laplace reverse transformation technique.

As step 1003 the instant forward and rear steering command angles are compared with the values obtained during the previous run (viz., delta f-1 and delta r-1) and the difference between the two values are recorded as DELTA delta f and DELTA delta r and the program flows on to step 1004. In this step it is determined if the value of DELTA delta f is positive (greater than zero) and the value of DELTA delta r is negative (less than zero). In the event that DELTA delta f>0 and DELTA delta f<0 it is deemed that conditions for increasing the ease with which yaw can be induced exist and the program flows to step 1005 wherein the instant auxiliary steering angles delta f and delta r are used in connection with a table of the nature shown in FIG. 4, viz a table which is plotted in terms of auxiliary steering angle and torque distribution correction value alpha, in a manner to obtain a factor having a value less than 1.

On the other hand, in the event that the outcome of step 1004 indicates that DELTA delta f>0 and DELTA delta r<0 then the program flows to step 1006 wherein the value of alpha is set to unity (viz., alpha=1).

At step 1007 the outputs (delta fd and delta fr) of the forward and rear auxiliary steering angle sensors 44 and 45 are read and the foreward and rear steering command angles delta delta f and delta r which were derived in step 1002 are used in a manner to derive a difference value for each of the forward and rear auxiliary steering arrangements. Viz., $$\text{DELTA delta f} = \text{delta f} - \text{delta fd} \quad (4)$$

$$\text{DELTA delta r} = \text{delta r} - \text{delta fr} \quad (5)$$

When these difference valves are zero the control signals CSfa, CSfb and CSra, CSrb are arranged to have a low value "0". When the difference values DELTA deta f>0 and DELTA delta r>0, the control signals CSfa and CSfb are induced to assume a high "1" level while control signals CSfb and CSrb are induced to assume a low level "0" signals. On the other hand when DELTA delta f<0 and DELTA delta r<0 then CSfa and CSfrb are set to "0" and CSfb and CSra are set to "1".

Accordingly, the forward and rear auxiliary steering cylinders 7 and 9 are feedback controlled in a desired manner. Further description of this control will be given hereinlater.

At step 1008 the value of alpha which is set steps 1005 or 1006 during the instant run is read out to torque distribution controller 41 and the program recycles.

When the vehicle is not moving, the respective wheel speed sensors 32L, 32R 33L and 33R output signals having a zero value. Accordingly, the value of DELTA N assumes a zero level value and torque distribution controller 31 outputs a zero level control signal the electromagnetic valve 26. As a result the hydraulically operated multi-plate clutch which is disposed in the transfer unit 12 assumes a dis-engaged condition and induces the situation wherein the torque distribution to the forward wheels reduces to 0% while that distributed to the rear wheels rises to 100%. Under these conditions if the vehicle is started from a standstill on road surface which exhibits a high degree of traction, the slip ratio of the rear wheels is low and the value of DELTA N is low. Accordingly, the degree to which clutch 21a is engaged is low and most of the torque is distributed to the rear wheels.

However, if the vehicle is rapidly accelerated or is driven on a slippery surface, due to slip and or lock of the rear wheels the value of DELTA N increases to a large value and in response to this the torque distribution controller 41 issues a high level control signal to the electromagnetic valve 26. Accordingly, the degree to which the clutch 21a is engaged increases toward a fully engaged condition. Under these conditions the amount of torque distributed to the forward wheels is increased in accordance with the value of DELTA N and induces four wheel drive to be produced.

On the other hand, when the vehicle is running and, as shown in FIG. 8 at time point t1, the steering wheel 6 is rotated in a manner to change the direction of the vehicle, the rack and pinion steering arrangement 4 changes the steering angle of the forward wheels 1R and 1L. The steering angle signal theta and the vehicle speed signal V are fed to the auxiliary steering controller 31 and result in the derivation of steering angles delta f and delta r via the use of the previously mentioned equations (1) and (2). As shown by the solid line traces in charts 8(b) and 8(c), the auxiliary steering of the front wheels is rapidly increased while that of the rear wheels is firstly temporarily reversed and then permitted to increase relatively slowly. As demonstrated by the broken line 13 in chart 8(d) the ease with which yaw is induced is increased and improves the response characteristics of the vehicle steering.

Figure 9:
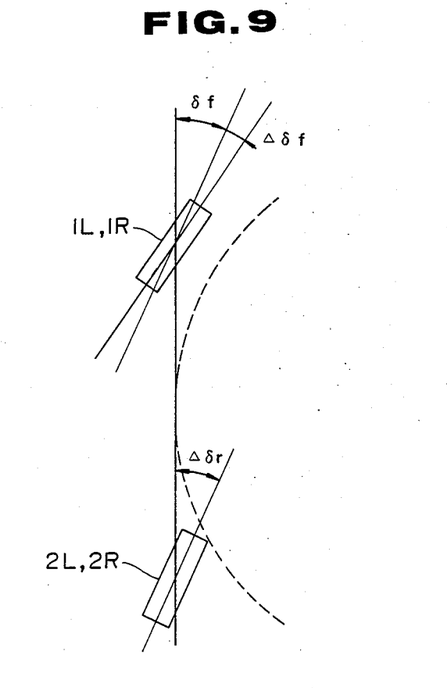
FIG. 9 is a diagram which shows the status of the front wheels under a given steering condition.

At this time as shown in FIG. 9 the front and rear wheels are steered in phase so that the front auxiliary steering angle command value delta f is increased until time point t3 while the rear auxiliary steering control valve delta r is decreased until time point t2. During the interval between time points t2 and t3 the value DELTA delta f becomes positive while the value of DELTA delta r becomes negative. The auxiliary steering controller thus proceeds from step 1004 to 1005 and a torque distribution correction value alpha having a magnitude less than 1 is obtained by look up or the like technique using data of the nature shown in FIG. 5.

When the value of alpha falls below 1 the torque distribution controller 41 derives the torque distribution amount T' and compares the same with the actual value T. In the event that the value of the T'/T ratio reduces the power outputted to the electromagnetic valve 26 is reduced and the degree of engagement of the clutch 21a is accordingly reduced. Accordingly, as shown in FIG. 3 by the broken line 1c, the torque distribution to the forward wheels reduces and the ease with which the vehicle can be induced to yaw is increased. As shown by the solid line 11 in FIG. 8(d), the yaw rate response characteristics are able to be improved.

Figure 8A:
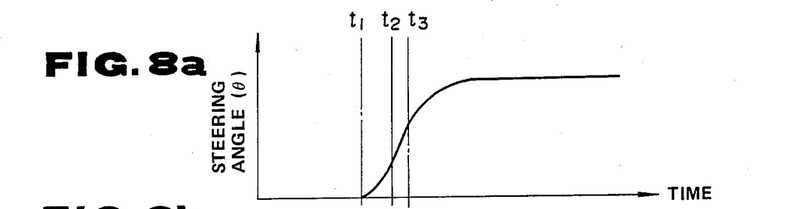
FIG. 8 is a timing chart which shows the various aspect of the control provided by the invention with respect to time.
Figure 8B:
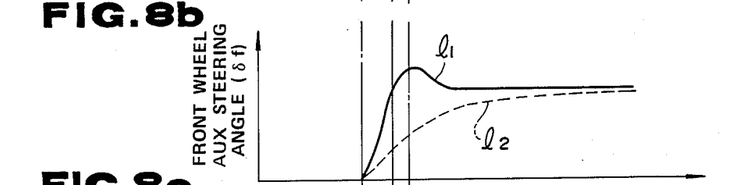
Figure 8C:
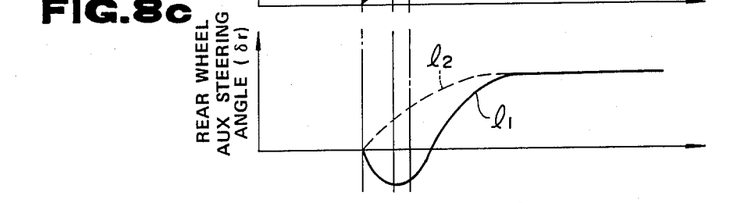
Figure 8D:
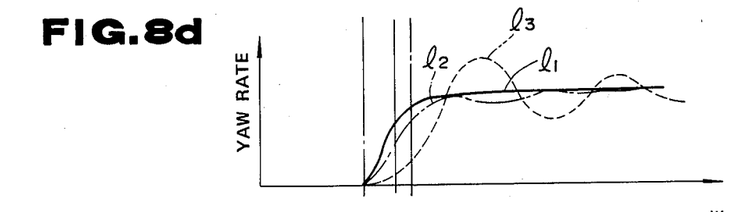
Figure 8E:
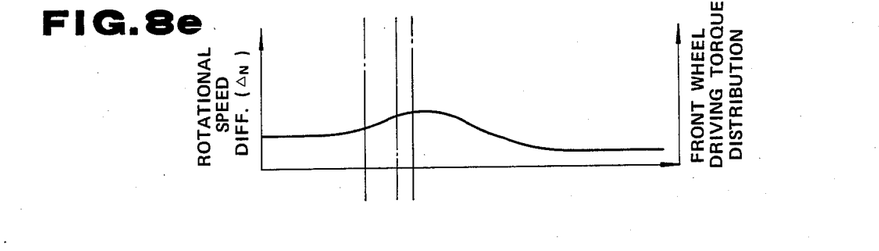
Figures 10A, 10B:
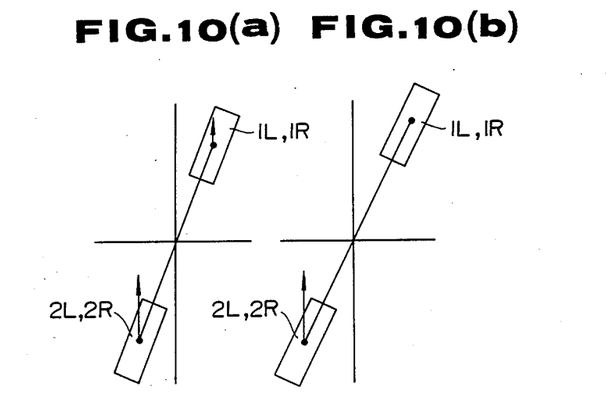
FIGS. 10A and 10B are diagrams which show wheel drive conditions which occur with changes in drive torque distribution

In other words, as shown in FIG. 8(e) when the vehicle is initially subject to steering the ease with which the vehicle can be induced to yaw is accompanied by a large increase in the front wheel rotational speed difference DELTA N. However, following this the magnitude of DELTA N decreases. Accordingly, as shown in FIG. 10(a) following the first portion of the initial stage of the steering, the amount of torque which is distributed to the front wheels increases and establishes a four wheel drive condition. When this four wheel drive is established, as driving force is produced by the front wheels the ease with which yaw can be induced tends to be suppressed. Accordingly, the yaw rate reduces a shown by the phantom line 12 in FIG. 8(d).

However, with the present invention, during the phase during which yaw rate response characteristics are improved, such as shown in FIG. 10(b), as the amount of torque which is distributed to the front wheels is reduced the torque which is delivered to the rear wheels enables the ease with the yaw can be induced to be increased and the steering characteristics of the vehicle to be correspondingly improved.

In the case the rear wheel steering angle is controlled relative to the front wheel steering angle simply with respect to the vehicle speed, the yaw rate, as show by the broken line 13 in FIG. 8(d) desirable response characteristics tend to change markedly toward undesirable ones. However, at time point t2, the rear wheel steering command value delta r increases and the amount by which the rear auxiliary wheel steering changes (DELTA delta r) reverts to a positive value and the program depicted in FIG. 7 flows from step 1004 to step 1006. This results in the torque distribution correction value alpha is set to "1". Following this, according to the difference between the front and rear steering command angles delta f and delta r, the control signals CSfa, CSfb, CSra and CSrb are issued in a manner which controls the operation of the front and rear auxiliary steering cylinders 7, 9.

As a result of the above control, the torque distribution controller 41 receives a signal (generated by the auxiliary steering controller 31) indicative of the torque distribution correction value alpha having a magnitude of "1". In accordance with the wheel speed difference DELTA N which is derived using equation (3) set forth herein before, and used in connection with the solid line trace 1N shown in FIG. 3, the amount of torque (T) which is distributed to the front wheels is held constant resulting in the electromagnetic valve 26 being controlled in manner which induces normal four wheel drive conditions.

A second embodiment of the present invention features the arrangement which is essentially the same as the first embodiment and which differs in that instead of determining whether the change in the forward auxiliary steering amount is positive and that of the rear auxiliary steering amount is negative (step 1004 of the flow chart shown in FIG. 7), the reverse process is carried out. Viz., in accordance with the second embodiment it is determined if the forward change is negative and the rear change is positive. In the event that the above situation exists then the control program flows to step 1005 while in event that such a condition is not detected the steering correction value alpha is set to unity (alpha=1).

Figure 5:
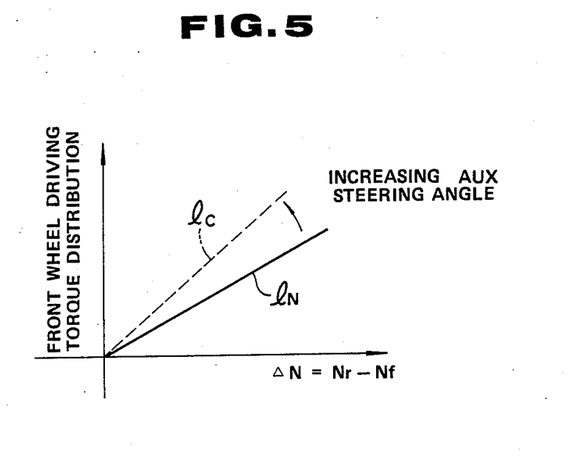
FIGS. 5 and 6 are charts which show the data used during the operation of a second embodiment of the invention under a second set of driving conditions wherein the auxiliary steering angle becomes set in a manner to inhibit the ease with which yaw can be induced and the torque distribution device is operated to distribute the driving torque in a manner to augment or promote the ease with which yaw is induced.
Figure 6:
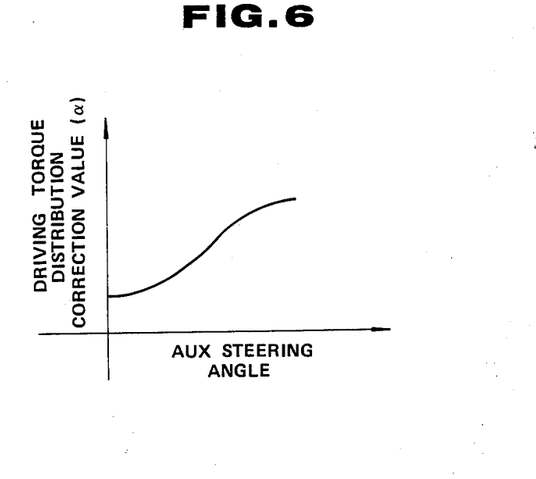

In accordance with the second embodiment it is possible to, in the event that driving conditions are such that the auxiliary steering angle becomes set in a manner to inhibit the ease with which yaw can be induced (e.g. the above mentioned negative-positive condition) it possible to increase the amount of torque which is distributed to the forward wheels. In order to implement the control of the second embodiment data of the nature shown in FIGS. 5 and 6 is used in place of the that shown in FIGS. 3 and 4 (first embodiment).

The first and second embodiments of the invention produce essentially the same results. Viz., the operational characteristics depicted in FIGS. 8(a)-8(e) are produced by both embodiments.

ALTERNATIVE ARRANGEMENTS/EMBODIMENTS

It should be noted that with the above disclosed embodiments even though the fixed values and constants such as Kf, Kr, Tf and Tr have been used, it is possible to use values which are variable in accordance with the various operational parameters of the system. Further, although the above embodiments have utilized auxiliary steering arrangements with both the front and rear wheels it is within the scope of the present invention to control only one of the two sets if so desired.

Figure 4:
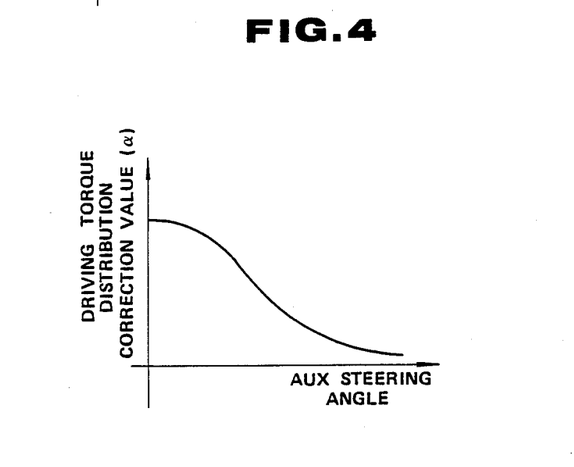

Additionally, it will be noted that although the use of tables such as that shown in FIG. 4 has been used in connection with the derivation of the torque distribution correction value of factor alpha, it is within the scope of the present invention to use techniques other than those which require the use of a relatively large amount of pre-recorded data. That is to say, it is possible to select a method wherein when yaw can be induced easily (i.e. when the change in the front and rear auxiliary steering amount are positive and negative respectively), the amount of torque which is distributed to the front wheels when auxiliary steering is not being executed or, alternatively, when yaw cannot be easily be induced, is compared with the instant torque distribution amount, and if in excess, the torque which is supplied the front wheels is corrected by a predetermined reduction.

Moreover, with the above described embodiments as an alternative to using the auxiliary steering controller 31 to detect the front and rear wheel driving torque distribution correction value alpha, it is within the scope of the present invention to utilize the torque distribution controller 41 in a manner wherein the correction value alpha is derived therein in response data inputs such as the front and rear steering command values deta f, delta r. As a further alternative it is possible to combine the controllers 31 and 41 into a single unit if so desired.

A further alternative arrangement comes in that instead of using the cross center type servo valves 20, 21 in a closed loop feedback arrangement, it is possible to use open centre type valves and to bias the pistons of the cylinders in one direction via the provision of suitable springs which tend to center the pistons in a predetermined home position.

Another possible alternative comes in that, instead of using cylinder 9 it is possible to utilize an arrangement wherein each of the rear wheels are connected to fixed points on the chassis via two lateral rods and to provide a hydraulic cylinder in one of the rods.

It is also possible to provide torque sensors (such as magnetostriction type sensors) on the propeller shafts 12h, 14 which lead from the transfer unit to the forward and rear differential gears 12g, 15 and to control the torque distribution in accordance with the sensed torque levels in place of and/or in addition to sensing the wheel speeds.

In place of the transfer unit 12 wherein the torque distribution is controlled by the application of the mutiplate hydraulic clutch 12a it is possible to utilize a differential type gear unit which is equipped with one or more hydraulically operated clutch arrangements. In this instance the torque can be readily be distributed by simply increasing and decreasing the appropriate hydraulic pressure or pressures.

What is claimed is:

1. In a four wheel drive train for an automotive vehicle:

an auxiliary steering device for providing auxiliary steering of at least one of said front and rear wheels, said auxiliary steering device being responsive to a manually induced steering angle of the front wheels in a manner to vary the amount of auxiliary steering produced by said auxiliary steering device;

auxiliary steering control means for controlling said auxiliary steering device;

sensor means for sensing a steering condition which is induced by the amount a yaw rate is increased by said auxiliary steering device;

a device for distributing driving torque from a prime mover between the forward and rear wheels of the vehicle;

a device for controlling said torque distribution device; and means for correcting the amount of driving torque which is supplied to the front wheels by said torque distributing device, said correcting means being responsive to said sensor means in a manner wherein when sensor means senses a steering condition wherein the ease with which yaw can be induced changes, the amount by which said driving torque distribution device distributes driving torque between the front and rear wheels is changed relative to the torque distribution before one of the auxiliary steering and the yaw rate varies in a manner to avoid sudden changes in the steering characteristics of the vehicle.

2. In a four wheel drive train for an automotive vehicle:

an auxiliary steering device for providing auxiliary steering of at least one of said front and rear wheels, said auxiliary steering device being responsive to a manually induced steering angle of the front wheels in a manner to vary the amount of auxiliary steering produced by said auxiliary steering device;

auxiliary steering control means for controlling said auxiliary steering device;

sensor means for sensing a steering condition which is induced by the amount a yaw rate is increased by said auxiliary steering device;

a device for distributing driving torque from a prime mover between the forward and rear wheels of the vehicle;

a device for controlling said torque distribution device; and means for correcting the amount of driving torque which is supplied to the front wheels by said torque distributing device, said correcting means being responsive to said sensor means in a manner wherein when sensor means senses a steering condition wherein the ease with which yaw can be induced is increased, the amount by which said driving torque distribution device distributes driving torque to the front wheels is reduced relative to the amount of torque distribution before one of the auxiliary steering and the yaw rate is increased.

3. In a four wheel drive train for an automotive vehicle:

an auxiliary steering device for providing auxiliary steering of at least one of said front and rear wheels, said auxiliary steering device being responsive to a manually induced steering angle of the front wheels in a manner to vary the amount of auxiliary steering produced by said auxiliary steering device;

auxiliary steering control means for controlling said auxiliary steering device;

sensor means for sensing a steering condition which is induced by the amount a yaw rate is increased by said auxiliary steering device;

a device for distributing driving torque from a prime mover between the forward and rear wheels of the vehicle;

a device for controlling said torque distribution device; and means for correcting the amount of driving torque which is supplied to the front wheels by said torque distributing device, said correcting means being responsive to said sensor means in a manner wherein when sensor means senses a steering condition wherein the ease with which yaw can be induced is attenuated, the amount by which said driving torque distribution device distributes driving torque to the front wheels is increased relative to the amount of torque distribution before one of the auxiliary steering and the yaw rate is increased.

4. In a four wheel drive train for an automotive vehicle having a prime mover and a transmission associated therewith, the combination comprising:

first and second forward wheels;

steering means, said first and second forward wheels being operatively connected with steering means in a manner such that the steering angle of said first and second wheels can be changed in response to a manually induced steering signal;

first and second rear wheels;

an auxiliary steering device, said auxiliary steering device being operatively connected with said first and second rear wheels, said auxiliary steering device being responsive to the manually induced steering angle of said first and second forward wheels to vary the amount of steering of said first and second rear wheels;

a power train operatively connecting said first and second forward wheels and said first and second rear wheels with the prime mover of the vehicle, said power train comprising:

a first differential gear associated with said first and second forward wheels;

a second differential gear associated with said first and second rear wheels;

a first shaft leading from said prime mover to said second differential gear;

a transfer gear, said transfer gear including a gear which is associated with said first shaft;

a second shaft leading from said transfer gear to said first differential gear;

a single clutch which selectively provides a drive connection between said first shaft and the gear of said transfer gear which is associated with said first shaft;

first and second rotational speed sensors for sensing the rotational speed of said first and second forward wheels;

third and fourth rotational speed sensors for sensing the rotational speed of said first and second rear wheels;

a driving torque distribution controller, said controller being operatively connected with said first, second, third and fourth rotational speed sensors, said controller being operatively connected with said clutch for controlling the degree of engagement of said clutch and the amount of torque which is supplied from said first shaft to said second differential, said controller being arranged, said controller comprising:

means for correcting the amount of torque which is supplied to said second differential in response to said first, second, third and fourth rotational speed sensors indicating that a steering condition has occurred wherein the ease with which yaw can be induced, has changed, in a manner wherein the amount of torque which is distributed between said first and second differential gears is changed relative to the amount of torque distribution before one of the auxiliary steering and yaw rate varies.

5. In a four wheel drive train for an automotive vehicle:

a first auxiliary steering device for providing auxiliary steering of said front wheels, said first auxiliary device being responsive to a manually induced steering angle of the front wheels in a manner to vary the amount of auxiliary steering of said front wheels produced by said first auxiliary steering device;

auxiliary steering control means for controlling said first auxiliary steering device;

sensor means for sensing a steering condition which is induced by the amount a yaw rate is increased by said auxiliary steering device, said sensor means comprising wheel speed sensors associated with each of said front and rear wheels;

means for distributing driving torque from a prime mover between the forward and rear wheels of the vehicle, said driving torque distributing means comprising a single clutch which determines the amount of torque distributed to said front wheels with respect to that supplied to said rear wheels;

a device for controlling said clutch; and means for correcting the amount of driving torque which is supplied to the front wheels by said clutch, said correcting means being responsive to said sensor means in a manner wherein, when the ease with which yaw can be induced changes, the amount by which said driving torque distribution device distributes driving torque between said front and rear wheels, is changed relative to the torque distribution before one of the auxiliary steering and the yaw rate varies in a manner to avoid sudden changes in the steering characteristics of the vehicle.

6. A four wheel drive train as claimed in claim 5 further comprising:

a second auxiliary steering device for providing auxiliary steering of said rear wheels, said second auxiliary device being responsive to a manually induced steering angle of the front wheels in a manner to vary the amount of auxiliary steering of said rear wheels produced by said second auxiliary steering device, said second auxiliary steering device being controlled by said auxiliary steering control means.

* * * * *